July 31, 1923.

G. WALTHER ET AL 1,463,349

WHEEL

Filed March 12, 1923

Inventors
George Walther,
Frank H. Watkley,
By Toulmin & Toulmin
Attorneys

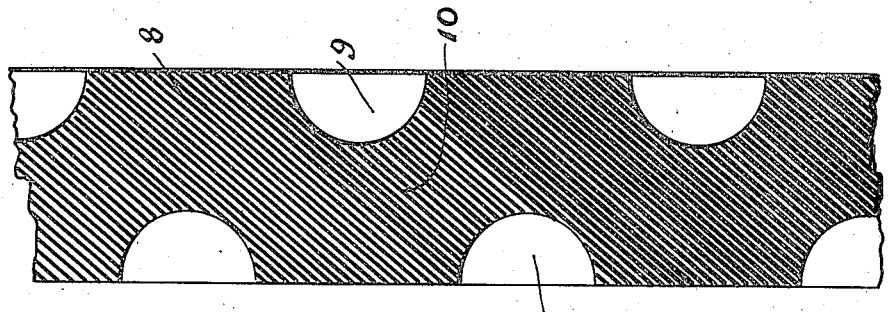
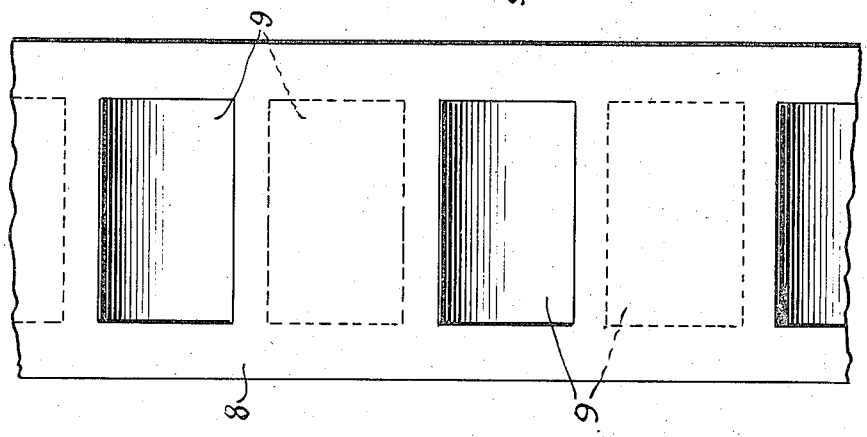
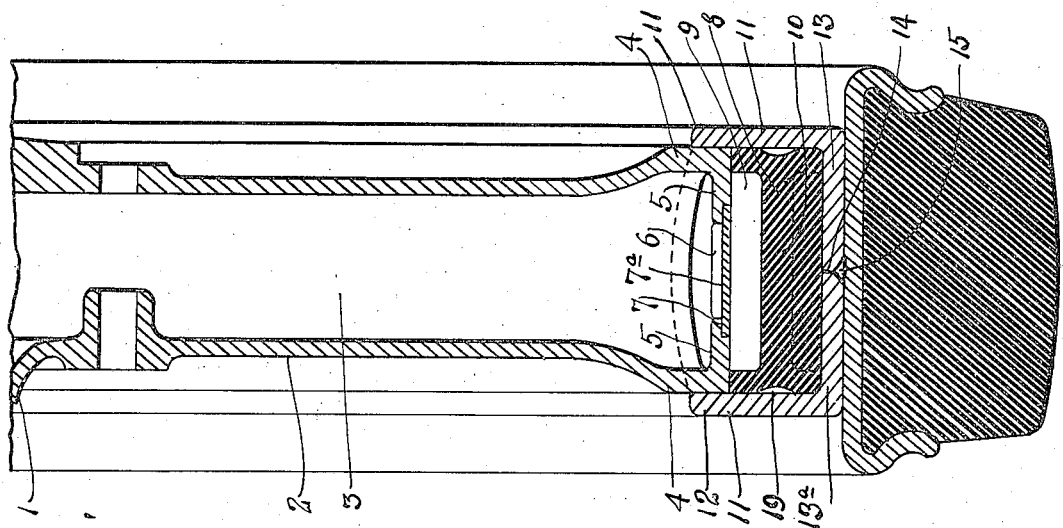

Patented July 31, 1923.

1,463,349

UNITED STATES PATENT OFFICE.

GEORGE WALTHER AND FRANK H. WALKLEY, OF DAYTON, OHIO, ASSIGNORS TO THE DAYTON STEEL FOUNDRY COMPANY, OF DAYTON, OHIO, A CORPORATION OF OHIO.

WHEEL.

Application filed March 12, 1923. Serial No. 624,421.

*To all whom it may concern:*

Be it known that we, GEORGE WALTHER and FRANK H. WALKLEY, citizens of the United States, residing at Dayton, in the county of Montgomery and State of Ohio, have invented certain new and useful Improvements in Wheels, of which the following is a specification, reference being had therein to the accompanying drawing.

Our invention relates to wheels, and in particular to cushion wheels.

It is a particular object of our invention to provide a readily assembled form of cushion wheel which is universally adaptable to support a rim for a tire, and a rim adapted to railway use.

It is a further object of our invention to provide a wheel which will be universal either for mounting a rim for a tire or mounting a railway rim.

It is a further object of our invention to provide a wheel which may have mounted upon it a yielding support on the rim in such a way that the several parts may be maintained in alignment when the rim is mounted on a wheel.

It is an additional object to provide a construction of a wheel having a cushion housing for the cushion which will permit of ready assembly and disassembly and which will provide a suitable support for the cushion.

In addition to the foregoing objects, it is also our object to provide a hollow wheel such as a wheel of cast steel in which the exit openings for the cores are suitably covered so that a smooth base for the cushion is provided, thus having the advantages of a solid wheel and the advantages of a hollow cast wheel combined in a single structure.

It is also our object to provide a cushion which provides by its arrangement a continuous support of the wheel upon the air cushions and a continuous support upon the resilient portions of the cushion, thus obviating the disadvantage of having alternate barriers of resilient material between alternate air cells.

Referring to the drawings:

Fig. 2 is a section through a portion of the wheel showing a rim and solid tire mounted thereon;

Fig. 3 is a plan view of a portion of the cushion;

Fig. 4 is a section through a portion of the cushion.

Figure 1:
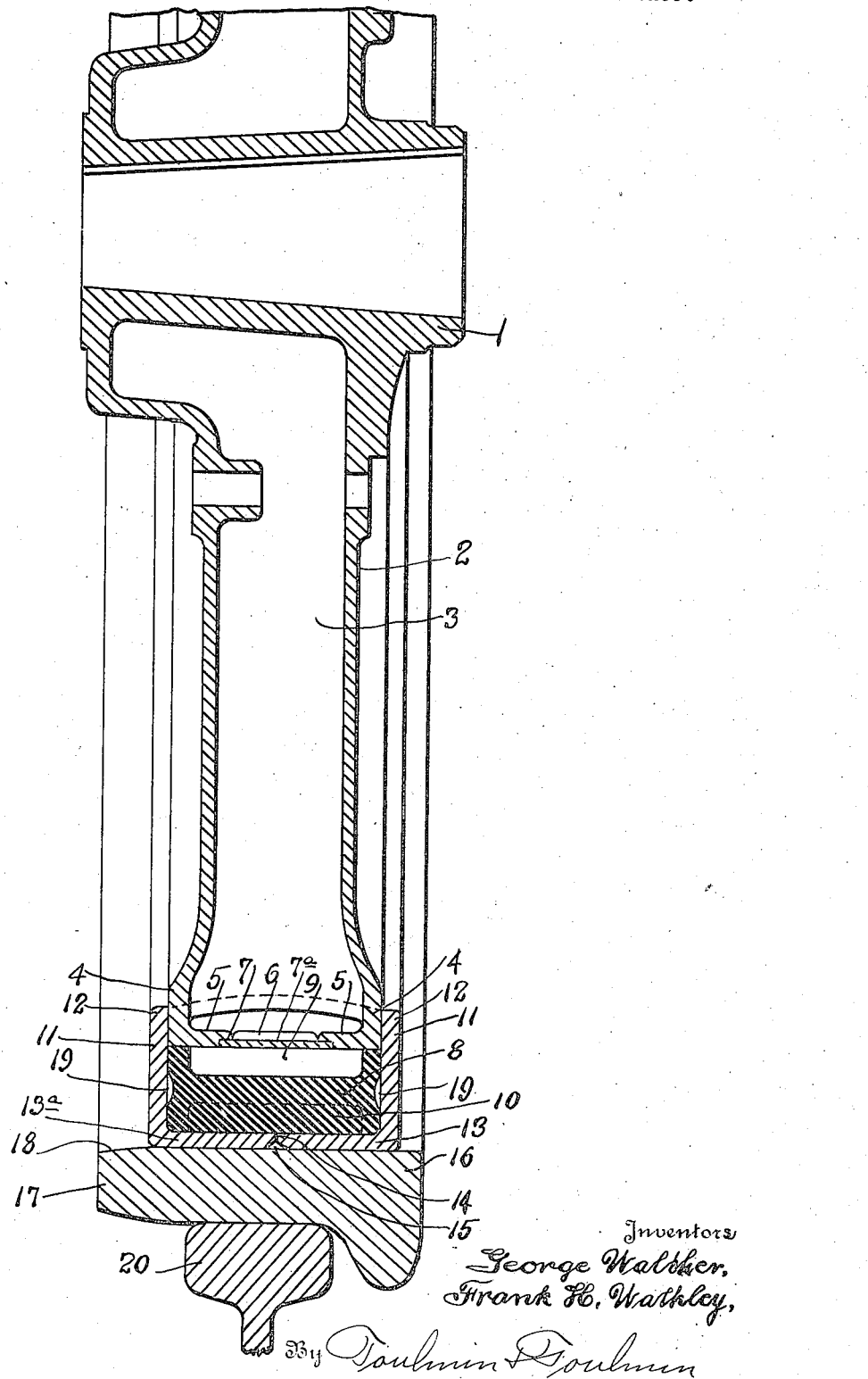
Figure 1 is a section of the wheel showing a railway rim mounted on the wheel.

Referring to the drawings in detail, 1 is a hub of a wheel having a plurality of spokes 2, preferably of cast steel and hollow as at 3.

The spokes terminate in a rim having side walls 4 and rim flanges at right angles thereto designated 5. These flanges are separated by a space 6 which is sometimes spaced at intervals.

These flanges 5 have cutaway shoulders 7 on which is mounted a steel ring or band 7ª which bridges the gap between the flanges 5.

This steel ring is arranged as a split ring, and is sprung into position. It is then clamped to bring its ends together, the ends are welded, any surplus metal at the weld being ground off, and there is presented a steel rim of the usual height with smooth surfaces for the support of resilient cushion 8 to be hereinafter described.

This cushion 8, of cylindrical shape, but rectangular in cross section, has a series of spaced semicircular transversely located cutaway portions 9.

Such cutaway portions appear on both the outer and inner faces of the resilient member 8 and provide air spaces or air cells so arranged on either side that they alternate with the result that when the weight of the vehicle is placed thereon the weight is always on one or more of these cells and the air confined therein.

The barriers of rubber or other resilient material between these air cells form the supporting mediums of resilient character which compose the cushion 8. Such barriers are designated 10.

After the cushion 8 is mounted upon the rim of the wheel, it is engaged on either side and on its outer periphery by right angled members 11. When the portion 11 overlaps, as at 12, the side walls 4 of the wheel, the portion 13 engages with the outer periphery of the resilient cushion.

It will be noted that these two right angle portions of metal engage at 14. The outer surfaces of their engaging edges are cut away as at 15.

When the rim such as a tire rim for use in railway work, designated 16, is forced on the wheel it first comes in contact with one of the members 13 with a tendency to force it inwardly due to the resiliency of the cushion supporting it. As a result of this a portion of 13 may be below the portion 13ª which composes a part of the other right angle member. The end 17 of 16 would, therefore, engage with the projecting end of 13ª were it not for the sloping end 15 thereof which permits the sloping end 18 of the wheel rim 16 to pass over any portion of 13ª which may be out of alignment.

In operation, due to the sliding of 12 with 4, as the weight of the vehicle comes upon the successive portions of the wheel, the resilient medium may be compressed and the movement accommodated by this sliding engagement of 4 with 12.

If desired, portions of the cushion may be cut off on the side as at 19 to permit of the compression of the cushion.

20 designates the top of a rail.

In case it is desired to mount a rim 21 of a solid tire 22 on the wheel, the procedure is the same as in mounting the rim for railway use.

It will be understood that we do not desire to be confined to the detail embodiment illustrated and described but comprehend within our invention suitable modifications.

Having thus fully described our invention, what we claim as new and desire to secure by Letters Patent, is:—

1. In combination, a wheel, a cushion member mounted on the periphery member thereof, and means to inclose said cushion in sliding engagement with said wheel, said means being adapted to support a rim, and said means being formed in two parts divided in the center of the periphery of the wheel having their ends adjacent to one another.

2. In combination, a wheel, a cushion member mounted on the periphery member thereof, and means to inclose said cushion in sliding engagement with said wheel, said means being adapted to support a rim, and said means being formed in two parts divided in the center of the periphery of the wheel having their ends adjacent to one another, the adjacent ends of said parts having their outer surfaces cutaway a portion of the depth of said parts.

3. In combination, a hollow wheel having hollow spokes, a rim on said spokes having a cutaway portion therein, a supplementary band bridging said cutaway portion mounted thereon, a cushion mounted on said band and on the periphery of the wheel having alternate resilient portions and air spaces on the inside and outside thereof, and circular cap members right-angled in section having their ends overlapping the sides of the rim of the wheel, and a rim carried on said circular members.

4. In combination, a hollow wheel having hollow spokes, a rim on said spokes having a cutaway portion therein, a supplementary band bridging said cutaway portion mounted thereon, a cushion mounted on said band and on the periphery of the wheel having alternate resilient portions and air spaces on the inside and outside thereof, and circular cap members right-angled in section having their ends overlapping the sides of the rim of the wheel, and a rim carried on said circular members, and means on said rim for engagement with a railway rail.

5. In combination, a cast metal wheel having a rim composed of rim flanges with a space therebetween and a supplementary band engaging said flanges and bridging the gap therebetween, a cushion member mounted thereon having alternate air spaces and resilient portions on either side of said cushion member, the air spaces on either side thereof being adapted to overlap, inclosing means consisting of circular members right-angular in section having their flanges slightly engaging with the sides of the wheel and their horizontal portions abutting one another.

6. In combination, a cast metal wheel having a rim composed of rim flanges with a space therebetween and a supplementary band engaging said flanges and bridging the gap therebetween, a cushion member mounted thereon having alternate air spaces and resilient portions on either side of said cushion member, the air spaces on either side thereof being adapted to overlap, inclosing means consisting of circular members right-angular in section having their flanges slightly engaging with the sides of the wheel and their horizontal portions abutting one another, the abutting portions being cutaway at their point of engagement, and a rim supporting all said portions, one side of which is elevated partially above the general level thereof to facilitate the mounting of said rim on the wheel.

7. In combination, a wheel consisting of a hollow hub, spokes, and rim, having spaced rim flanges and supplementary members bridging the gap therebetween, a cushion mounted thereon having resilient side walls, air chambers formed in the top and bottom thereof between side walls, said chambers being located alternately on the top and bottom so as to provide support for the wheel upon air constantly, and inclosing means on the outside of said cushion engaging the outside periphery and the side walls, said inclosing means also slightly engaging with the sides of the wheel rim.

In testimony whereof, we affix our signature.

GEORGE WALTHER.
FRANK H. WALKLEY.